Jan. 12, 1932.  J. SACHS  1,841,212
BOX FOR INCLOSING ELECTRICAL APPURTENANCES
Filed July 29, 1922
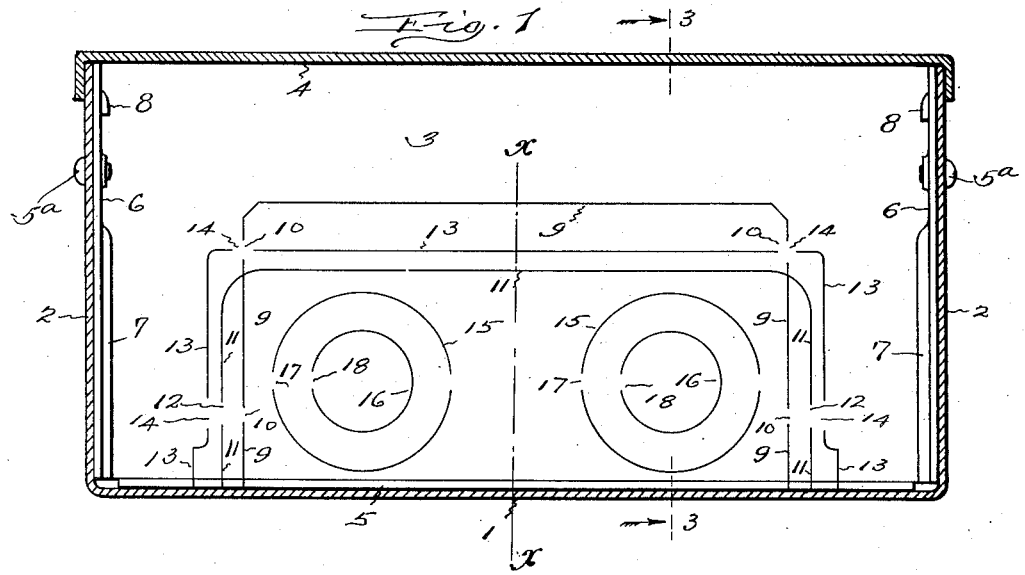
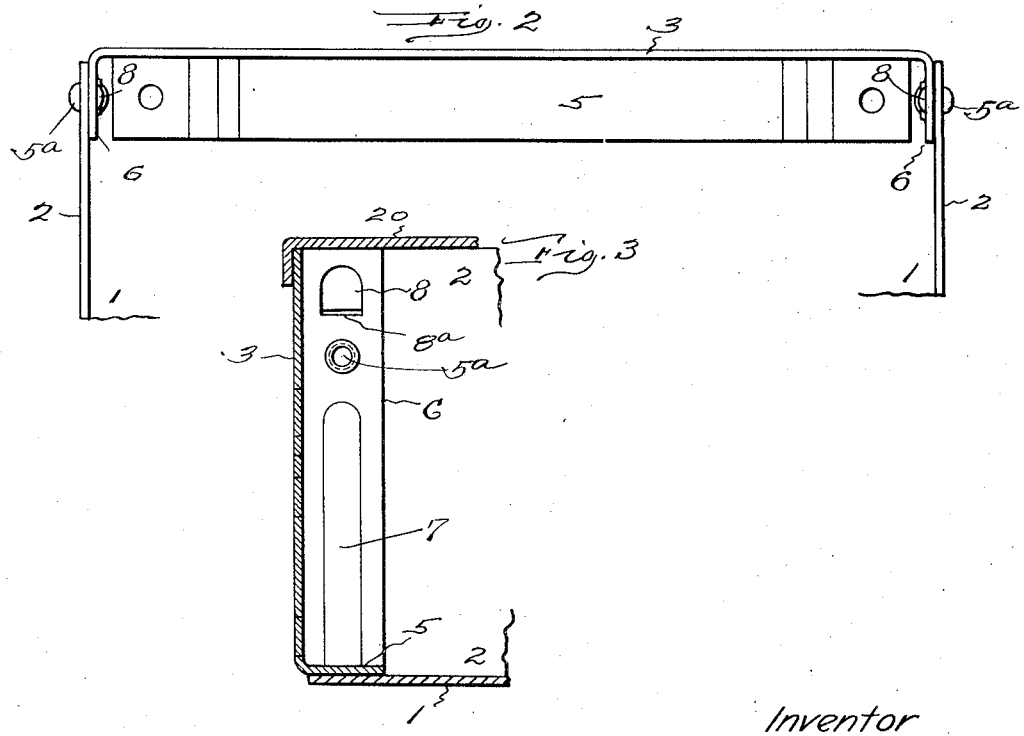

Patented Jan. 12, 1932

1,841,212

UNITED STATES PATENT OFFICE

JOSEPH SACHS, OF WEST HARTFORD, CONNECTICUT

BOX FOR INCLOSING ELECTRICAL APPURTENANCES

Application filed July 29, 1922. Serial No. 578,342.

Service blocks, such as branch blocks, switch blocks, cut-out blocks and combinations of these, when used in connection with meters are commonly placed in cabinets or boxes designed to be sealed so that the electrical devices and connections cannot be reached and tampered with by unauthorized persons. These boxes have been provided with end walls having openings for receiving or fitting upon the meter terminal chambers. The end walls have sometimes been made permanent and sometimes have been made removable. The meter terminal chambers of the standard types of meters vary in size and shape. When the end walls are integral entire boxes having openings in the end walls designed to fit the particular meters with which they are to be used, must be furnished, that is, complete boxes having openings in the end walls of a definite size and shape must be furnished for use with each of the different types of meters. If the end walls are removable, interchangeable end walls, having openings adapted to fit the different meter terminal chambers, must be made and kept on hand ready to meet the conditions of the various installations.

The object of the present invention is to produce boxes with end walls so formed that they can be readily made to meet any of the usual conditions which arise in connection with the common installations, and thereby eliminate the necessity of manufacturing and keeping in stock several different types of boxes or a number of different styles of end walls for such boxes.

In accordance with the invention I have provided a meter circuit protector including means which adapt a single integral wall member selectively to partially or to entirely complete the closing of the casing, the said wall member serving when only partially completing such closing to cooperate with meter casings of various forms and sizes.

This object is attained by providing boxes or end walls for the boxes which are scored, stamped or partially severed in such manner that the required section may be readily knocked out to furnish the particular opening for any of the standard types of meters, whereby the boxes may be installed and left completely closed by the contractor, but in such condition that the service corporation employee may easily remove the sections of the end walls necessary to adapt the boxes to the immediate circumstances.

In the accompanying drawings Figure 1 is a transverse sectional view of a box provided with a removable end wall constructed according to this invention. Fig. 2 is a front view of a portion of the box with the cover omitted. Fig. 3 is a vertical sectional view on the plane indicated by the dotted line 3—3 on Fig. 1.

In the views the box is represented as having a rear wall 1 and side walls 2 pressed to shape from sheet metal in an ordinary manner. The box is provided with end walls, of which one is shown at 3, and it is further provided with the usual front cover 4, connected in any usual or preferred manner so as to close the box.

At least one end wall 3, as shown in the drawing, is preferably constructed and arranged to be readily detachable from the other parts of the box. It is shown as having been stamped to shape from sheet metal and as extending entirely across the end of the box. When so extended it is provided with an inwardly extending flange 5 at the rear edge and inwardly extending flanges 6, 6 at the side edges. The side flanges are designed to fit between the sides 2, 2 of the box and to be engaged therewith or fastened thereto in any suitable way, as by means of ribs pressed inward from the sides of the box and adapted to spring into corresponding recesses at 7, 7 in the side flanges 5, 5 of the end wall. The side walls of the box are preferably also formed with lugs 8 adapted to enter holes 8ª in the said flanges 5, 5 of the end wall. The lugs 8 prevent removal of the end wall except by spreading the side walls 2, 2 outward. From an inspection of Fig. 1 it will be clear that the side walls cannot be thus spread while the cover 4 therefor serves to prevent removal of the end wall. If desired the end wall 4 may also be held by screws 5ª, 5ª.

In accordance with one phase of the invention one wall of the box has a plurality of sections integral therewith but scored to be easily separable therefrom, the said scored sections overlapping each other and respectively having the outlines of parts of various meters with which the box may be used. When one of the scored sections is removed the aforesaid part of the particular meter to be installed may be passed into the resulting opening with a substantially close fit. Thus the box is adapted for use with any one of two or more different sizes or types of meters without any alteration of construction or any change of parts other than the removal of the proper separable section.

When a removable end wall is provided as shown and described the said removable or separable sections are preferably provided in the said end wall, the rear edges of the sections being coincident with each other and with the rear edge of the wall. This makes it possible for boxes to be readily provided with different end walls adapted to meet different conditions and it also makes it possible for the end wall to be temporarily removed to facilitate the making of the meter connections.

When the end wall is formed it is scored or partially punched out, and the punched sections are preferably set back again. As illustrated, the wall is scored or punched on the lines 11 of an outline which when the punched section is knocked out will leave an opening that will fit the meter terminal chamber of one of the standard types of meters. Readily broken integral portions 12 are left unpunched on the score lines to hold this section in position until it is knocked out. The end wall is also additionally scored or punched on the lines 13 forming a section that when removed will leave an opening which will fit another standard type of meter terminal chamber. Readily broken portions 14 are left unpunched on these lines to hold this section in position until it is knocked out. The end wall may be additionally scored or punched on lines 9 of an outline to fit another standard type of meter terminal chamber, portions 10 of this scoring being left unbroken to hold this section in position until it is knocked out. The sections outlined by the lines 9, 11 and 13 overlap each other so that all or a portion of each section is included within the outline of each other section. Furthermore they are so arranged that they are all symmetrically disposed with relation to a common center line such as x—x. The said sections are of different widths and depths and they may be of such sizes and shapes that the score lines, such as 9, of one of them intersect the score lines, such as 11 and 13, of others of them. When the score lines thus intersect, the result is that each section is divided into two or more units which must be firmly held in position to prevent accidental removal or displacement. It will be observed that the said readily broken integral portions 10, 12 and 14 are so arranged and distributed that each unit is directly connected with the main body of the wall at at least two places. Even in the case of a unit such as that bounded by the lines 10, 10 and 11, the several integral portions 10, 12 and 14 are in line with each other so as to provide a direct connection with the main body of the wall. The end wall may also be, and preferably is, scored or punched along one or more circular lines such as 15 and 16, with portions 17 and 18 left unpunched to retain these sections in place. The circular sections outlined by the lines 15 and 16 are adapted to be removed to permit the connection of a wire receiving conduit. It will be observed that the said circular sections are in the central unit which is common to all of the sections outlined by the lines 9, 11 and 13, and that the said circular sections therefore adapt the box for the alternative direct connection of a wire containing conduit at the position ordinarily occupied by a meter.

It will be observed that the end wall 3 which has been described is a part of the meter circuit protector and constitutes a single integral wall member bridging the opening between the side walls 2, 2 of the casing. The described separable sections of the wall member 3 constitute means adapting said wall member 3 selectively to partially or entirely complete the closing of the said casing. The said sections are initially integral with the wall member and are adapted to serve to entirely complete the closing of the casing; but when one or another of the said sections is removed the said wall member only partially completes the closing of the casing and is then adapted to cooperate with one or another of two or more meter casings of various forms and sizes to prevent unauthorized access to conductors housed by said protector.

With this invention but one style of box need be built by the manufacturer and sold to the contractor who puts the boxes in place and leaves them with the walls closed, for these boxes can be readily fitted to any of the ordinary types of meters at any future time by the service men of the central station, as the required section may be readily knocked out to meet the conditions arising at the time the meters are installed and the service connections made. This effects a great saving in the cost of production and putting to use of these protective boxes.

The invention claimed is:

1. A meter circuit protector comprising a casing having an opening and a single integral wall member bridging said opening, said protector including means adapting said wall member selectively to partially or to entirely complete the closing of said casing, and when partially completing such closing to cooperate with meter casings of various forms and sizes to prevent unauthorized access to conductors housed by said protector.

2. A meter circuit protector comprising a casing having an opening of a size larger than the terminal housing end portion of any of a plurality of meters of different styles and sizes, and a single wall member bridging said opening and having integral parts for selective cooperation with any of said terminal housings to prevent access through said opening to conductors housed by said protector.

3. A meter service box for containing electric circuit controlling appurtenances and connections, the said box including a wall provided with overlapping sections of different outlines integral therewith but scored to be easily separable therefrom, the said scored sections having outlines substantially conforming respectively to parts of various meters with which the box may be used, whereby the box may be installed prior to the installation of the meter with all of its walls intact and enclosing the circuit controlling appurtenances and connections in the interior thereof and whereby upon installation of the meter the necessary section may be removed so as to provide an opening into which the aforesaid part of the particular meter to be installed may be passed with a substantially close fit in order to ensure the protection of the meter as well as of the circuit controlling appurtenances and connections within the box.

4. A meter service box for containing electric circuit controlling appurtenances and connections, the said box including end and side walls of which one is provided with a plurality of overlapping sections of different depths and widths integral therewith but scored to be easily separable therefrom, the said scored sections having their rear edges coincident and immediately adjacent the rear plane of the box and the said sections having outlines substantially conforming respectively to parts of various meters with which the box may be used and the said sections being symmetrically disposed with relation to a common center line, whereby the box may be installed prior to the installation of the meter with all of its walls intact and enclosing the circuit controlling appurtenances and connections in the interior thereof and whereby upon installation of the meter the necessary section may be removed so as to provide an opening into which the aforesaid part of the particular meter to be installed may be passed with a substantially close fit in order to ensure the protection of the meter as well as of the circuit controlling appurtenances and connections within the box and in order to locate the meter in a predetermined central position irrespective of the size or type thereof.

5. A meter service box for containing electric circuit controlling appurtenances and connections, the said box including side and end walls of which one has a plurality of intersecting scores providing a corresponding plurality of overlapping sections of different depths and widths integral with the wall but easily separable therefrom, the said scored sections having their rear edges coincident and immediately adjacent the rear plane of the box and the said sections having outlines substantially conforming respectively to parts of various meters with which the box may be used, whereby the box may be installed prior to the installation of the meter with all of its walls intact and enclosing the circuit controlling appurtenances and connections in the interior thereof and whereby upon installation of the meter the necessary section may be removed so as to provide an opening into which the aforesaid part of the particular meter to be installed may be passed with a substantially close fit in order to ensure the protection of the meter as well as of the circuit controlling appurtenances and connections within the box.

6. A meter service box for containing electric circuit controlling appurtenances and connections, the said box including an openable front cover and an end wall secured by the said cover against removal when the cover is in closed position but removable when the cover is in open position, the said removable end wall having overlapping sections of different outlines integral therewith but scored to be easily separable therefrom and the said scored sections having their rear edges coincident with the rear edge of the end wall and having outlines substantially conforming respectively to parts of various meters with which the box may be used, whereby the box may be installed prior to the installation of the meter with all of its walls intact and enclosing the circuit controlling appurtenances and connections in the interior thereof and whereby upon installation of the meter the necessary section may be removed so as to provide an opening into which the aforesaid part of the particular meter to be installed may be passed with a substantially close fit in order to ensure the protection of the meter as well as of the circuit controlling appurtenances and connections within the box.

7. As an article of manufacture, an end wall adapted to form a part of a meter service box for containing electric circuit controlling appurtenances and connections and comprising overlapping sections of different outlines integral therewith but scored to be easily separable therefrom, the said scored sections having their rear edges coincident and at the rear edge of the end wall and having outlines substantially conforming respectively to parts of various meters with which the said end wall and other box parts may be installed.

JOSEPH SACHS.